United States Patent
Cairo (10) Patent No.: US 7,938,623 B2
(45) Date of Patent: May 10, 2011

(54) INFLATABLE WIND TURBINE BLADE AND METHOD FOR FORMING SAID ROTOR BLADE

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 41 days.

(21) Appl. No.: 12/411,481

(22) Filed: Mar. 26, 2009

(65) Prior Publication Data

US 2010/0143130 A1 Jun. 10, 2010

(51) Int. Cl.
*F03D 1/06* (2006.01)
*F03D 11/00* (2006.01)

(52) U.S. Cl. ............ 416/84; 416/226; 416/230; 416/240

(58) Field of Classification Search ............. 416/84–86, 416/224, 226, 229 R, 230, 241 A, 232–233, 416/240; 440/98, 100; 60/495–507; 29/889.71, 29/889.72; 244/123.11, 65, 8, 12.2, 17.23, 244/17.25, 23 C, 99.8
See application file for complete search history.

(56) References Cited

U.S. PATENT DOCUMENTS

| 2,616,509 | A | * | 11/1952 | Thomas ........................ 416/84 |
| 3,101,121 | A | * | 8/1963 | MacNeal ................. 244/123.11 |
| 3,138,506 | A | * | 6/1964 | Ross ........................ 244/123.11 |
| 3,384,183 | A | * | 5/1968 | Braverman ..................... 416/84 |
| 3,957,232 | A | * | 5/1976 | Sebrell ..................... 244/123.11 |
| 4,547,124 | A | * | 10/1985 | Kliatzkin et al. ............... 416/86 |
| 7,726,943 | B2 | * | 6/2010 | Stommel ...................... 416/233 |
| 2007/0081900 | A1 | * | 4/2007 | Nies ............................. 416/224 |
| 2009/0238692 | A1 | * | 9/2009 | Buchler ........................ 416/240 |

FOREIGN PATENT DOCUMENTS

DE 2923463 A1 * 6/1979

* cited by examiner

*Primary Examiner* — Christopher Verdier
(74) *Attorney, Agent, or Firm* — Global Patent Operation; Douglas D. Zhang (57) ABSTRACT

An inflatable rotor blade for a wind turbine includes a flexible skin. The flexible skin assumes, when inflated by means of an inflation medium, the shape of an airfoil which has an inner cavity. When the inner cavity is formed, at least one stiffener unit is arranged in the inner cavity of the rotor blade and maintains the airfoil shape of the flexible skin.

19 Claims, 6 Drawing Sheets

FIG. 6

INFLATABLE WIND TURBINE BLADE AND METHOD FOR FORMING SAID ROTOR BLADE

BACKGROUND

The present disclosure generally relates to wind turbines for converting wind energy into electrical energy.

A wind turbine typically includes a rotor having at least one rotor blade and a hub, and a machine nacelle wherein the machine nacelle is arranged rotatably atop a wind turbine tower. The overall weight of the machine nacelle including the rotor determines the design of the mechanical arrangement which is used for rotating the machine nacelle about a vertical axis, e.g. a vertical tower axis. The weight and the structure of the at least one rotor blade of the wind turbine contributes to the overall weight deposited onto the machine nacelle.

Furthermore heavy and bulky rotor blades are typically transported using complex transportation means. In order to save shipping costs, the weight of individual rotor blades and other components attached to the machine nacelle of a wind turbine may be an issue. Rotor blades of wind turbines which are structured in a complicated way thus increase the overall weight atop the wind turbine tower. The consequence is a bearing assembly for arranging the machine nacelle rotatably atop the wind turbine power which can withstand high loads.

SUMMARY

In view of the above an inflatable rotor blade for a wind turbine is provided, said inflatable rotor blade including a flexible skin which assumes, when inflated by means of an inflation medium, the shape of an airfoil wherein an inner cavity is formed, and at least one stiffener unit arranged in the inner cavity of the rotor blade and adapted for maintaining the airfoil shape of the flexible skin.

According to another aspect a wind turbine including a rotor having at least one inflatable rotor blade and a hub, and a machine nacelle is provided, said inflatable rotor blade including a flexible skin which assumes, when inflated by means of an inflation medium, the shape of an airfoil wherein an inner cavity is formed, and at least one stiffener unit arranged in the inner cavity of the rotor blade and adapted for maintaining the airfoil shape of the flexible skin.

According to yet another aspect a method for forming a rotor blade of a wind turbine is provided, the method including the steps of forming a flexible skin as an outer shell of the rotor blade, inflating the flexible skin by means of an inflation medium such that the outer shell assumes the shape of an airfoil, and stiffening the airfoil shape by means of at least one stiffener unit arranged in the interior of the rotor blade.

Further exemplary embodiments are according to the dependent claims, the description and the accompanying drawings.

DRAWINGS

A full and enabling disclosure, including the best mode thereof, to one of ordinary skill in the art is set forth more particularly in the remainder of the specification including reference to the accompanying drawings wherein.

DETAILED DESCRIPTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

Figure 1:
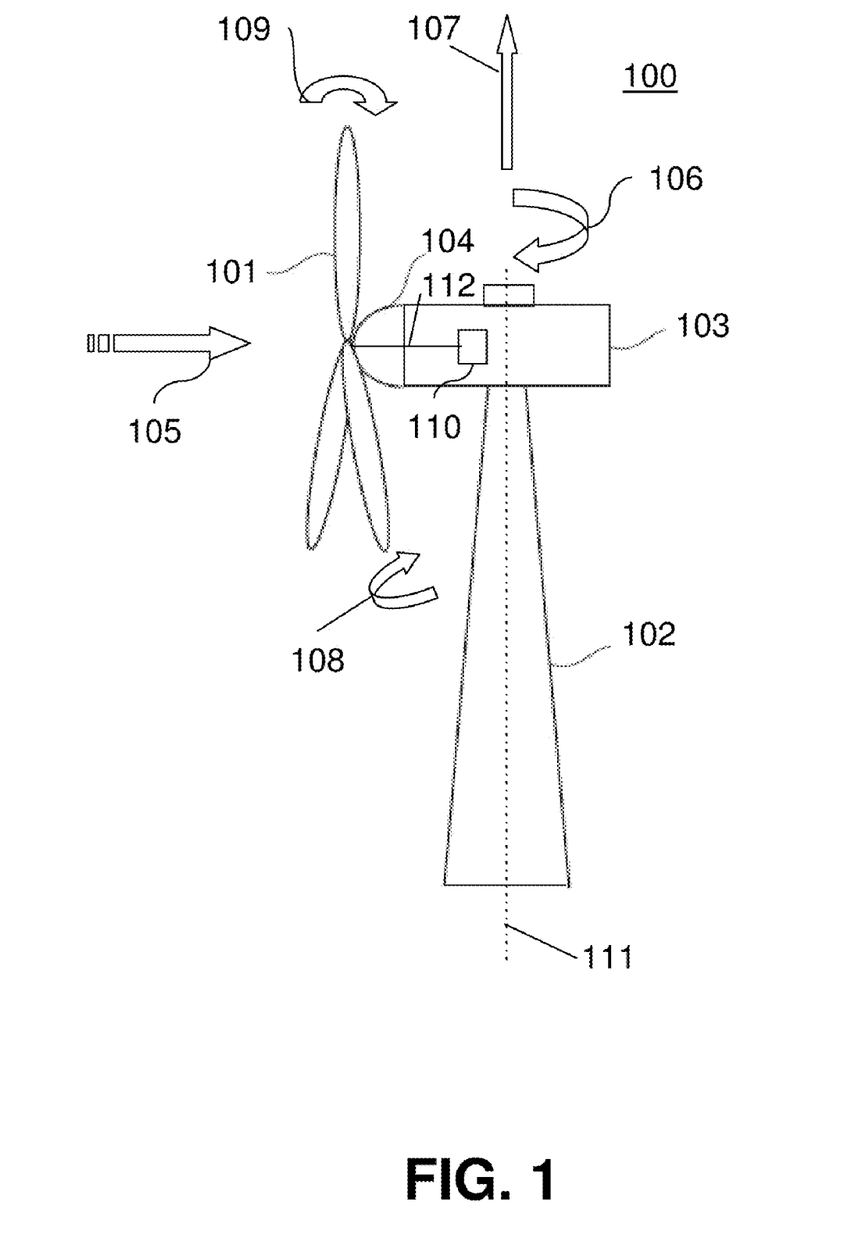
FIG. 1 shows a wind turbine in a schematic side view explaining the principal functions provided at the wind turbine.

FIG. 1 is a side view of a wind turbine according to a typical embodiment. FIG. 1 shows a typical wind turbine as an environmentally safe and relatively inexpensive energy source.

The wind turbine 100 includes a machine nacelle 103, which is rotatably mounted on top of a tower 102. The wind turbine 100 further includes a rotor having a hub 104 and at least one rotor blade 101. The machine nacelle 103 may be rotated with respect to a yaw angle 106 about a vertical tower axis 111. The rotation about the vertical tower axis 111 typically is such that the incoming wind direction 105 coincides with the extension of the main shaft 112 of the wind turbine 100. A yaw momentum 107 may be applied by yaw motors (not shown in FIG. 1) in order to adjust the yaw angle 106. Due to wind shear which might occur typically in a vertical direction, a bending moment 109 may act on the main shaft 112 and, as a consequence, on the whole machine nacelle 103 together with the tower 102.

The main shaft is connected, inter alia, to a rotation sensor 110 in order to measure a rotation frequency of the rotor of the wind turbine 100. A pitch angle 108 which corresponds to a rotation of an individual rotor blade about its longitudinal axis may be adjusted using pitch motors (not shown). The pitch angle 108 is adjusted such that an appropriate rotational velocity of the main axis 112 with respect to the strength of the incoming wind 105 is obtained.

The components contained inside or outside the machine nacelle 103 typically rotate together with the machine nacelle 103 about the vertical tower axis 111. In order to save yaw energy for changing the yaw angle 106, the overall weight of the machine nacelle 103 including internal and external components is an issue when designing a wind turbine 100. Besides gearboxes, the main shaft, the gearbox shaft, yaw angle motors (not shown) etc., the weight and size of the individual rotor blades (turbine blades, airfoil) 101 contributes to the overall shipping size and overall weight which has to be rotated about the vertical tower axis 111.

According to the typical embodiment shown in FIG. 1, the weight of the rotor blades 101 is decreased, because the rotor blades 101 are designed as inflatable rotor blades (see description below with respect to FIGS. 3, 4 and 5).

Figure 2:
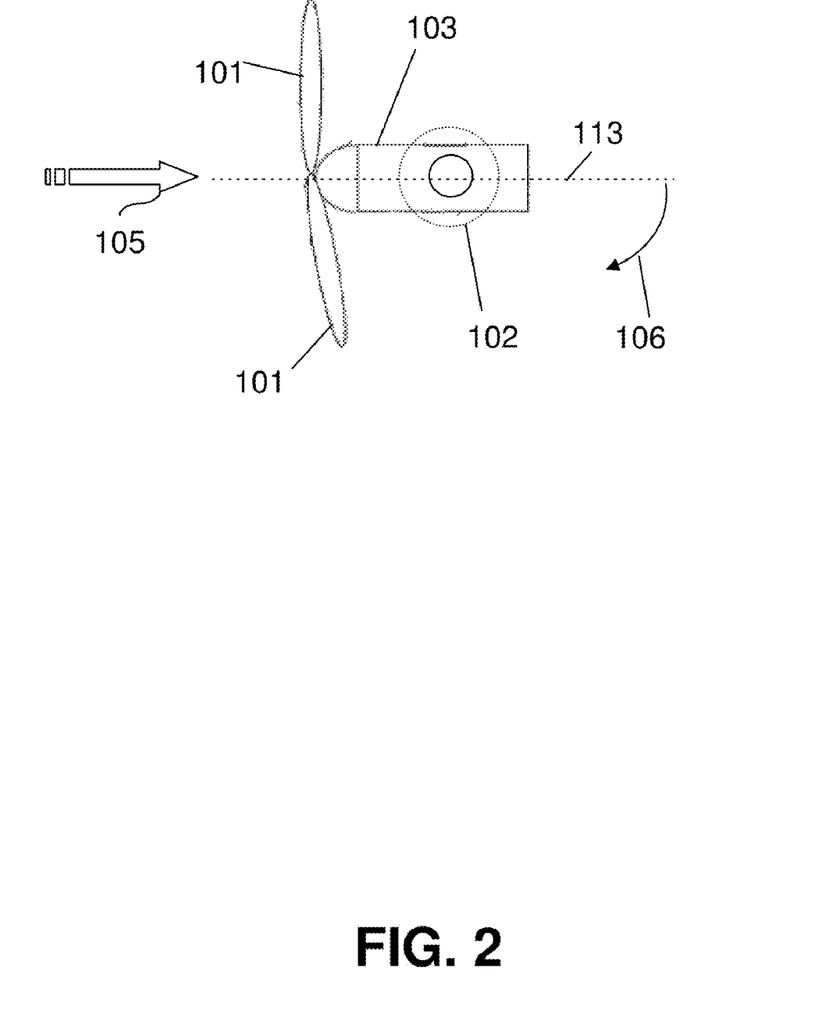
FIG. 2 is a top view of a wind turbine illustrated in FIG. 1.

FIG. 2 is a top view of the wind turbine 100 shown in FIG. 1, wherein two inflatable rotor blades 101 are shown. The rotor blades rotate about a typically horizontal axis 113. The wind turbine tower 102 is shown as a tubular tower, but the disclosure is not restricted to a tubular tower 102. The yaw angle 106 is measured from the horizontal axis 113 such that the machine nacelle 103 may be directed towards the incoming wind direction 105.

As illustrated in FIG. 2, the contribution of the wind turbine rotor blades 101 with respect to size and weight is an issue when the machine nacelle 103, the bearings between the machine nacelle 103 and the tower 102 and the entire wind turbine 100 are designed.

Figure 3:
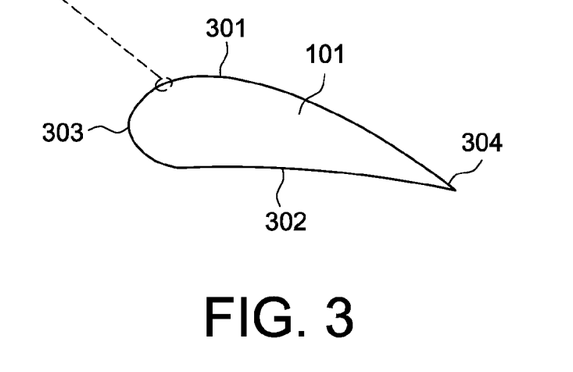
FIG. 3 is a cross-section of a rotor blade indicating essential components of a rotor blade.
Figure 3A:
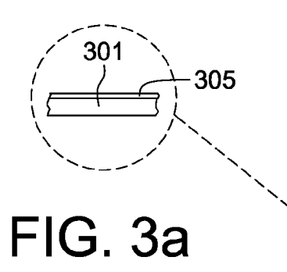
FIG. 3a is an enlarged, partial view from the rotor blade of FIG. 3.

FIG. 3 is a cross-section of an inflatable rotor blade 101 according to a typical embodiment. FIG. 3 shows a cross-sectional view, wherein a reference numeral 303 denotes a leading edge of the inflatable rotor blade 101, and reference numeral 304 denotes a trailing edge of the inflatable wind turbine blade. According to the cross-sectional shape of the inflatable rotor blade 101, a suction side 301 is formed at the high-curvature portion, wherein a pressure side 302 is formed at the low-curvature portion of the inflatable rotor blade 101. FIG. 3 is a schematic cross-sectional view only indicating the shape of the outer skin of the inflatable rotor blade 101.

Figure 4:
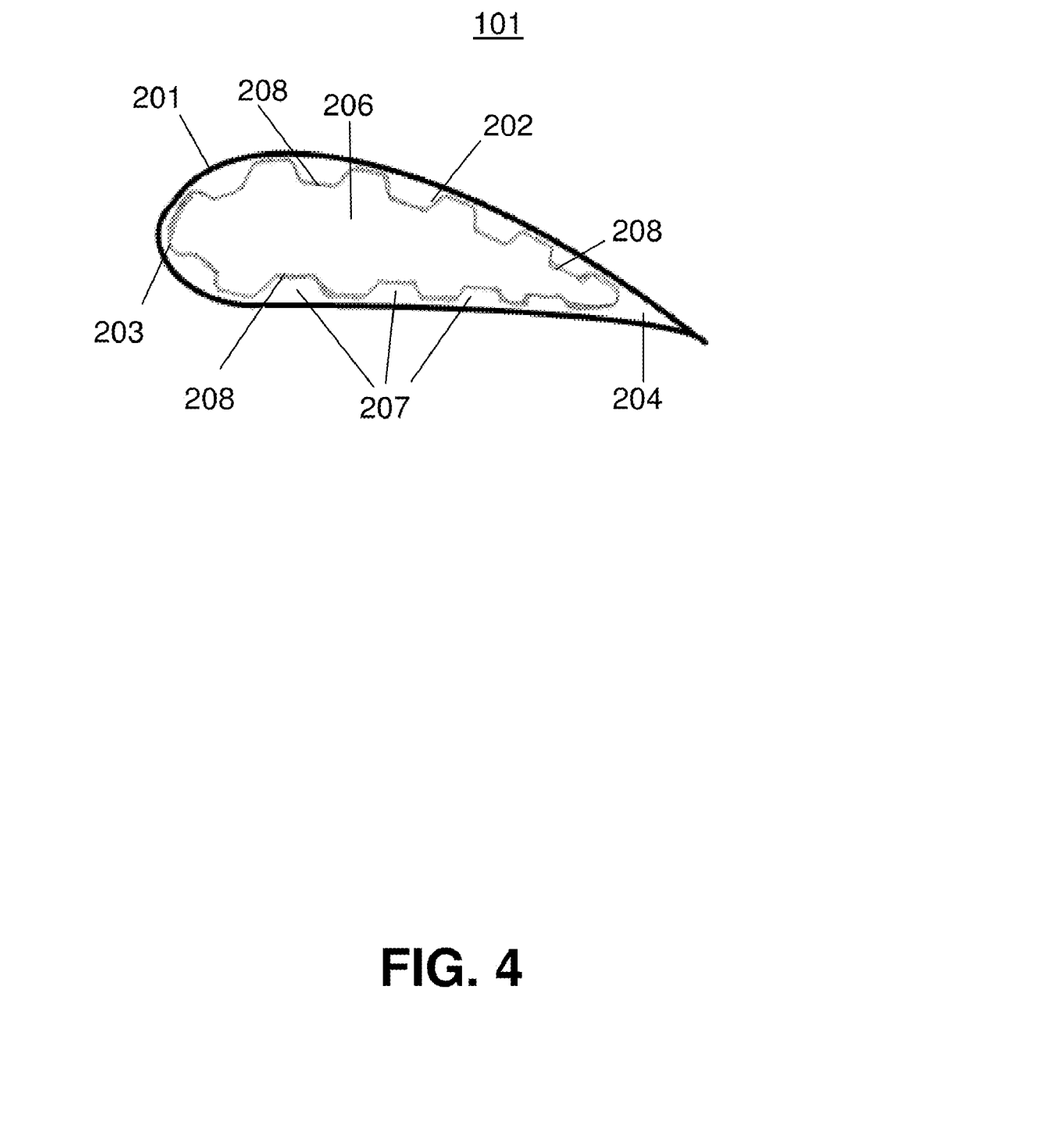
FIG. 4 is an inflatable rotor blade having stiffener units inside a flexible skin of the rotor blade, according to a first typical embodiment.

FIG. 4 is a more detailed view of an inflatable rotor blade 101 according to a first embodiment. As shown in FIG. 4, a stiffener unit is formed integrally with a flexible skin 201 which is provided as an outer surface of the inflatable rotor blade 101.

The flexible skin 201 may be made of toughened, polymer-based engineered fabrics similar to those used for inflatable buildings. The fabrics are treated for enhanced environmental durability with UV (ultraviolet) light protection and have fibers and a weave that has high resistance against environmental conditions such as hail or stone impact, bird impact, ice loading and high wind velocity. As shown in FIG. 4, the flexible skin 201 may be formed with integral stiffener units, wherein a spacing and depth of the stiffener units are provided on the basis of the blade size and the blade loading. The stiffener unit 202 may include stiffener caps 208 which are sized to provide a flexural and axial rigidity to carry design loads and to provide a margin against resonance frequency modes.

The stiffener unit 202 may be provided with an aggregate flexural rigidity and an axial rigidity which is equal to or which exceeds those provided by conventionally configured rotor blades. Figures of merit for rigidities are (1) blade elongation, (2) blade twist, and (3) blade tip deflection due to flexure. Internal pressures can range from 15 to 30 psi depending on whether the architecture is an integrally stiffened skin or frame and stringer with skin overlay.

The caps can include any number of high strength or modular composite materials such as carbon or fiber glass epoxy. The caps may be separated from the skin portion of the fabric by independent air chambers, e.g. by independent outer air pressure chambers 207 which are arranged opposite to an inner air pressure chamber 206. The outer air pressure chambers 207 provide damage tolerance to the entire assembly, i.e. if one chamber is ruptured, the other will continue to function. The skin and the integral stiffening assembly are one piece such that costs of a secondary joint attaching the pressure and suction side of a span-wise split blade are eliminated.

A specific size and a spacing of the stiffener caps 208 are subject to a plurality of variables. A design of the stiffener caps may be such that an aggregate flexural rigidity and axial rigidity is provided which equals or exceeds those obtained by conventionally configured blades.

The flexible skin 201 moreover may be made from a material including at least one of a plastic foil, toughened polymer-based fabrics, a polymer material, a carbon fiber material and a fiber glass epoxy material. Synthetic fabrics such as fiber glass and polyester are commonly used in commercial inflatable buildings.

The first typical embodiment of the disclosure shown in FIG. 4 is based on an inflatable rotor blade which is formed from a one-piece flexible skin. The interior chamber, e.g. the inner air pressure chamber 206, may be inflated using an inflation medium which is at least one of ambient air, a nitrogen gas, an argon gas, a helium gas or a mixture thereof.

Furthermore an outside of the flexible skin of 201 of the inflatable rotor blade 101 may be coated by an UV protection layer 305. Vinyl polymers such as polyvinyl chloride and Teflon are typically used for UV protection and environmental durability.

The flexible skin 201 and the at least one stiffener unit 202 are formed as an integral unit in one piece.

The at least one stiffener unit 202 includes a leading edge stiffener 203 at a leading edge 303 of the inflatable rotor blade 101 (see FIG. 3) and/or a trailing edge stiffener 204 at the trailing edge 304 of the inflatable rotor blade 101 (see FIG. 3).

It is noted here that the at least one stiffener unit 202 includes at least one stiffener cap 208 such that the stiffener cap 208 is separated from an inner surface of the flexible skin 201 of the inflatable rotor blade 101 to provide both axial and flexural stiffness in the longitudinal (span wise) direction.

Figure 5:
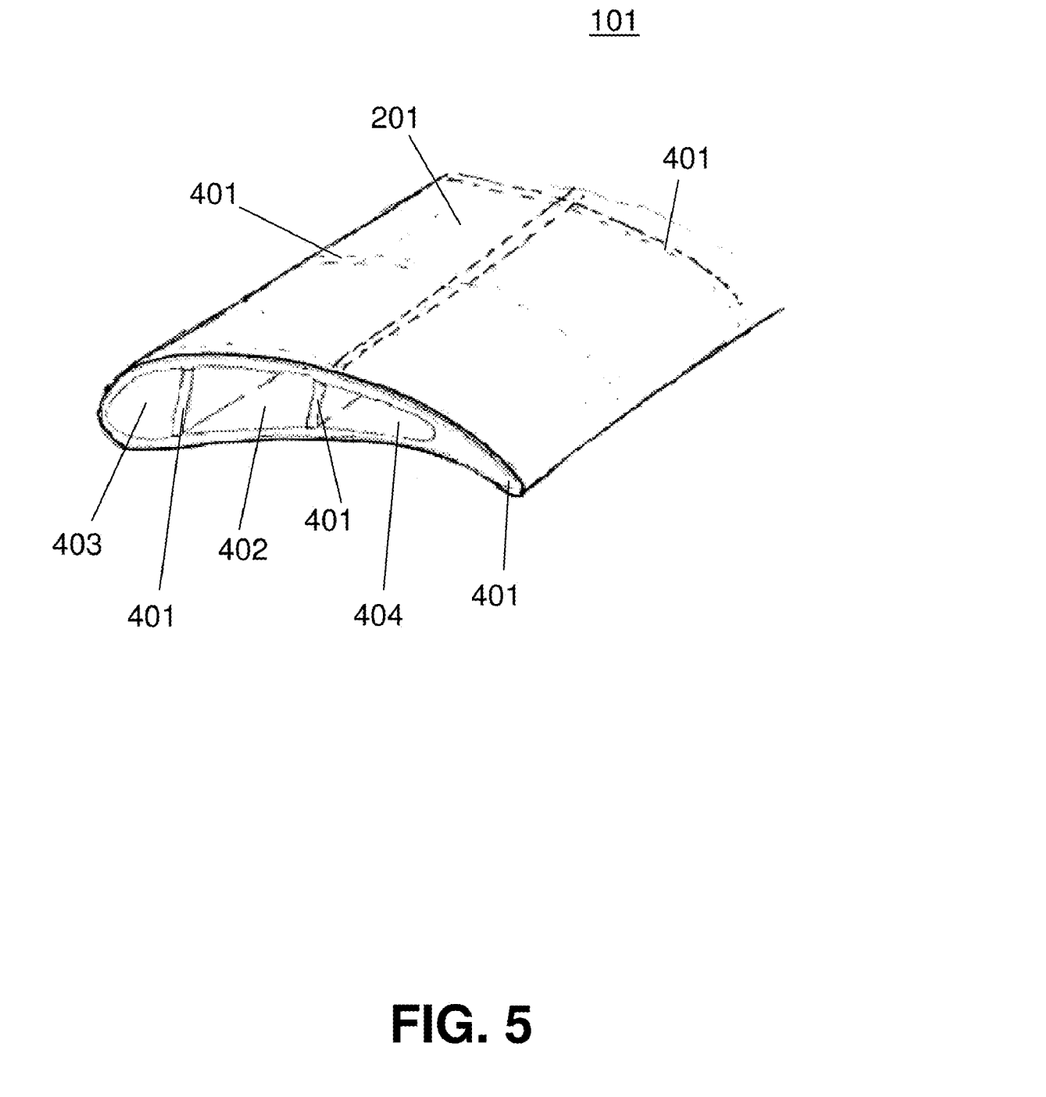
FIG. 5 is a perspective sectional view of an inflatable rotor blade having stiffening units within a cavity provided by a flexible skin, according to another embodiment.

FIG. 5 is a perspective sectional view of an inflatable rotor blade 101 according to another typical embodiment. As shown in FIG. 5, the flexible skin 201 is drawn over a structural frame and stringer assembly. The structural frame and stringer assembly may be either one piece or may be designed in modular sections in order to facilitate shipping. Leading and trailing edge structural members are provided in order to maintain airfoil contours and in order to provide a backing with respect to impact events.

The chambers are formed by the boundaries of the frames and stringers and are pressurized in order to maintain the form of an airfoil structure. The structural frame and stringer assembly includes a number of frame elements (stringers or longitudinal stiffeners) 401 which are arranged in the interior of the inflatable rotor blade 101. The frame elements 401 divide the interior space of the inflatable rotor blade 101 into different chambers, as shown in FIG. 5, provide transverse shear capability, and separate the pressure and suction side surfaces of the blade. A central edge pressure chamber 402 is provided in the center of the inflatable rotor blade 101.

On the other hand, a trailing edge pressure chamber 404 is provided at the trailing edge 304 (FIG. 3) and a leading edge pressure chamber 403 is provided at the leading edge 303 (FIG. 3) of the inflatable rotor blade 101. Furthermore the inflatable rotor blade 101 according to FIG. 5 may be designed such that the structural frame and stringer assembly is provided as a one-piece unit. Furthermore the structural and stringer assembly may be provided as a modular arrangement.

The inflatable rotor blade according to either the first embodiment shown in FIG. 4 or the other typical embodiment shown in FIG. 5 may be attached at the rotor by means of a rotor blade bearing. A pump unit 501 (FIG. 1) may be provided in the hub 104 of the rotor such that the pump unit may pump the inflation medium into the interior space of the inflatable rotor blade 101. Furthermore a pump unit 501 (FIG. 1) may be provided in the machine nacelle 103 such that the pump unit may pump the inflation medium in the interior of the inflatable rotor blade 101 from the environment of the machine nacelle 103.

Figure 6:
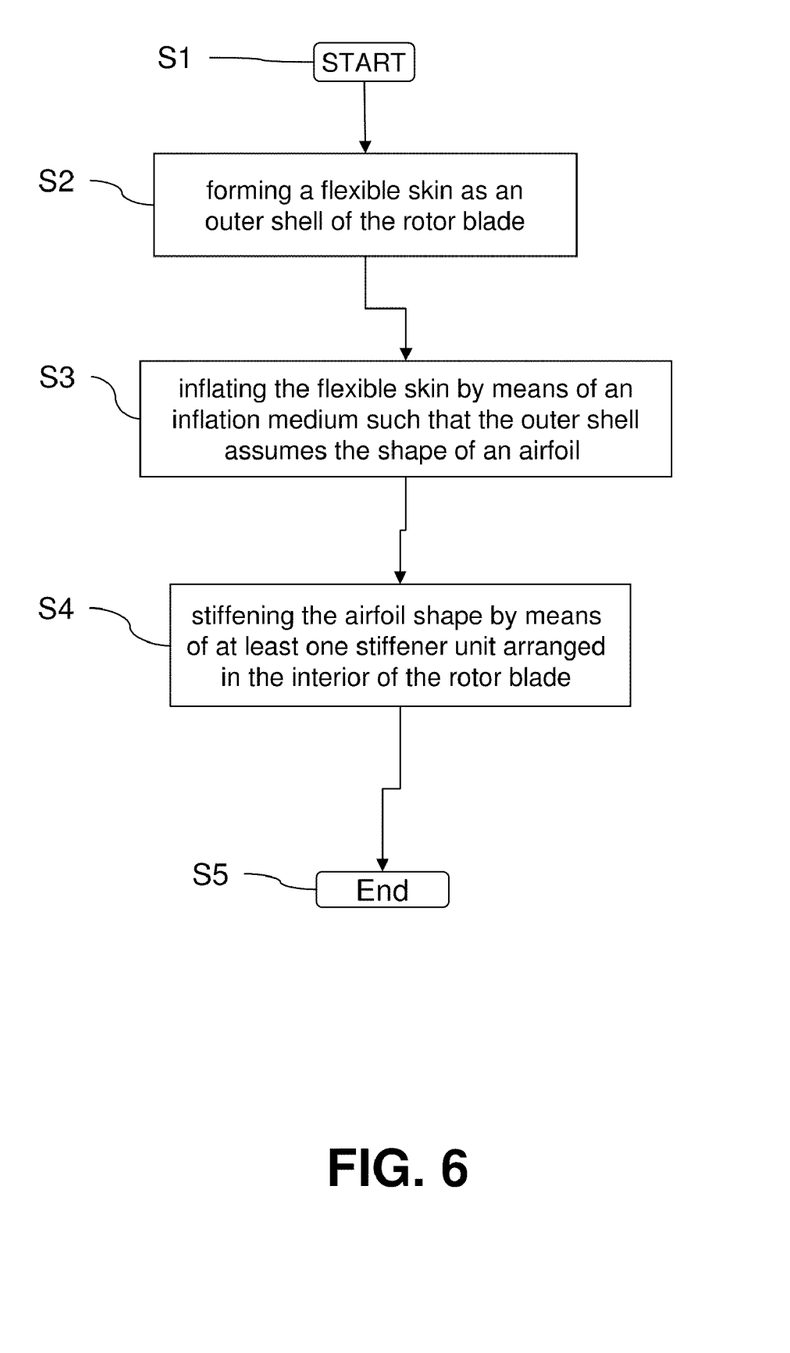
FIG. 6 is a flowchart of a method for forming a rotor blade of a wind turbine using a flexible skin and stiffener units.

FIG. 6 is a schematic flowchart illustrating a method for forming a rotor blade of a wind turbine. The procedure starts at a step S1 and proceeds to a step S2 where a flexible skin is formed as an outer shell of the rotor blade. Then the procedure advances to a step S3 where the flexible skin is inflated by means of an inflation medium such that the outer shell of the flexible skin assumes the shape of an airfoil. This airfoil is used as a rotor blade of the wind turbine described above with respect to FIGS. 1 and 2.

Then the procedure advances to a step S4. Here, the airfoil shape is stiffened by means of at least one stiffener unit. The stiffener unit is arranged in the interior of the rotor blade. According to a first embodiment, the flexible skin and the at least one stiffener unit are formed as an integral unit in one piece. Furthermore it is possible that the stiffener unit includes a structural frame and stringer assembly which is separate from the flexible skin. The structural frame and the stringer assembly may be provided as a modular arrangement. At a step S5 the procedure is ended.

Although a one-piece flexible skin is possible, it would not provide the advantage of damage tolerance that multi-layer skin can provide. This is significant for environmental threats such as bird strikes or hard body debris impacted at high velocity during high wind events. The multi-layer skin may be provided using an architecture including e.g. two polymer or rubber layers sandwiching a layer of fiber glass.

The invention has been described on the basis of embodiments which are shown in the appended drawings and from which further advantages and modifications emerge. However, the disclosure is not restricted to the embodiments described in concrete terms, but rather can be modified and varied in a suitable manner. It lies within the scope to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the disclosure and its broader aspects. That is, all examples set forth herein above are intended to be exemplary and non-limiting.

The invention claimed is:

1. An inflatable rotor blade for a wind turbine, said inflatable rotor blade comprising:
a flexible skin which assumes, when inflated by an inflation medium, an airfoil shape having an inner cavity; and
a rigid stiffener unit arranged in the inner cavity and comprising a plurality of spaced stiffeners extending along a length of the rotor blade and configured to maintain the flexible skin in the airfoil shape, and a plurality of spaced stiffener caps, each of the stiffener caps connecting two adjacent stiffeners and spaced apart from an inner surface of the flexible skin, the stiffeners and the stiffener caps defining a single air chamber.

2. The inflatable rotor blade in accordance with claim 1, wherein the flexible skin is made from a material comprising at least one of a plastic foil, toughened polymer based fabrics, a polymer material, a carbon fiber material, and a fiber glass epoxy material.

3. The inflatable rotor blade in accordance with claim 1, wherein the flexible skin is formed from a one-piece flexible skin.

4. The inflatable rotor blade in accordance with claim 1, wherein the space between each of the stiffener caps and the inner surface of the flexible skin defines an independent air chamber.

5. The inflatable rotor blade in accordance with claim 1, wherein the inflation medium is at least one of ambient air, a nitrogen gas, an argon gas, a helium gas, and a mixture thereof.

6. The inflatable rotor blade in accordance with claim 1, wherein an outside surface of the flexible skin of the rotor blade is coated by an UV protection layer.

7. The inflatable rotor blade in accordance with claim 1, wherein the flexible skin and the stiffener unit are formed as an integral unit in one piece.

8. The inflatable rotor blade in accordance with claim 1, wherein the stiffeners comprise a leading edge stiffener disposed in the inner cavity at a leading edge of the airfoil shape.

9. The inflatable rotor blade in accordance with claim 1, wherein the stiffeners comprise a trailing edge stiffener disposed at a trailing edge of the airfoil shape.

10. A wind turbine comprising at least one inflatable rotor blade, said inflatable rotor blade comprising:
a flexible skin which assumes, when inflated by an inflation medium, an airfoil shape having an inner cavity; and
a rigid stiffener unit arranged in the inner cavity and comprising a plurality of spaced stiffeners extending along a length of the rotor blade and configured to maintain the flexible skin in the airfoil shape, and a plurality of spaced stiffener caps, each of the stiffener caps connecting two adjacent stiffeners and spaced apart from an inner surface of the flexible skin, the stiffeners and the stiffener caps defining a single air chamber.

11. The wind turbine in accordance with claim 10, wherein the inflatable rotor blade is attached at a rotor of the wind turbine by means of a rotor blade bearing.

12. The wind turbine in accordance with claim 11, wherein a pump unit is provided in a hub of the rotor, said pump unit being adapted for pumping the inflation medium into the interior of the inflatable rotor blade through the rotor blade bearing.

13. The wind turbine in accordance with claim 10, wherein a pump unit is provided in a machine nacelle of the wind turbine, said pump unit being adapted for pumping the inflation medium into the interior of the inflatable rotor blade.

14. The wind turbine in accordance with claim 10, wherein the flexible skin is made from a material comprising at least one of a plastic foil, toughened polymer based fabrics, a polymer material, a carbon fiber material, and a fiber glass epoxy material.

15. The wind turbine in accordance with claim 10, wherein the flexible skin is formed from a one-piece flexible skin.

16. The wind turbine in accordance with claim 10, wherein the space between each of the stiffener caps and the inner surface of the flexible skin defines an independent air chamber.

17. The wind turbine in accordance with claim 10, wherein the inflation medium is at least one of ambient air, a nitrogen gas, an argon gas, a helium gas, and a mixture thereof.

18. A method for forming a rotor blade of a wind turbine, the method comprising:
forming a flexible skin as an outer shell of the rotor blade;
inflating the flexible skin by an inflation medium such that the outer shell assumes an airfoil shape having an inner cavity; and
stiffening the airfoil shape by a rigid stiffener unit arranged in the inner cavity, the stiffener unit comprising a plurality of spaced stiffeners extending along a length of the rotor blade and configured to maintain the flexible skin in the airfoil shape, and a plurality of spaced stiffener caps, each of the stiffener caps connecting two adjacent stiffeners and spaced apart from an inner surface of the flexible skin, the stiffeners and the stiffener caps defining a single air chamber.

19. The method in accordance with claim 18, wherein the airfoil shape is modified by changing a pressure of the inflation medium.

* * * * *

UNITED STATES PATENT AND TRADEMARK OFFICE
CERTIFICATE OF CORRECTION

| | | |
|---|---|---|
| PATENT NO. | : 7,938,623 B2 | Page 1 of 2 |
| APPLICATION NO. | : 12/411481 | |
| DATED | : May 10, 2011 | |
| INVENTOR(S) | : Ronald Ralph Cairo | |

It is certified that error appears in the above-identified patent and that said Letters Patent is hereby corrected as shown below:

In the Drawings:

Delete sheet 1 of 6, and replace with sheet 1. (Attached)

Signed and Sealed this
First Day of November, 2011

David J. Kappos
*Director of the United States Patent and Trademark Office*

FIG. 1